United States Patent [19]

Trinquard

[11] Patent Number: 4,981,116
[45] Date of Patent: Jan. 1, 1991

[54] APPARATUS AND METHOD FOR WRAPPING A BELT IN AN INTERNAL COMBUSTION ENGINE AND THE LIKE AND AN INTERNAL COMBUSTION ENGINE WITH APPARATUS FOR WRAPPING A BELT AND ASSOCIATED METHOD

[75] Inventor: Roger Trinquard, St. Leger des Vignes, France

[73] Assignee: Caoutchouc Manufacture et Plastiques S.A., Versailles, France

[21] Appl. No.: 452,684

[22] Filed: Dec. 15, 1989

[30] Foreign Application Priority Data

Dec. 16, 1988 [FR] France ................. 88 16601

[51] Int. Cl.$^5$ ............................. F16H 7/12
[52] U.S. Cl. .................. 123/90.31; 474/134
[58] Field of Search ............ 123/90.31; 474/133, 474/134, 135

[56] References Cited

U.S. PATENT DOCUMENTS

| 1,016,787 | 2/1912 | Sewall | 474/134 |
| 3,941,006 | 3/1976 | Brodesser | 474/134 |
| 4,464,146 | 8/1984 | Arthur | 474/135 |
| 4,473,362 | 9/1984 | Thomey et al. | 474/135 |
| 4,504,254 | 3/1985 | Foster | 474/133 |
| 4,525,152 | 6/1985 | Speer et al. | 474/133 |
| 4,715,333 | 12/1987 | Oyaizu | 123/90.31 |
| 4,758,208 | 7/1988 | Bartos et al. | 474/135 |
| 4,813,915 | 3/1989 | Kotzab | 474/133 |
| 4,886,483 | 12/1989 | Henderson | 474/135 |

FOREIGN PATENT DOCUMENTS 0114779 1/1984 European Pat. Off. .
3528442 1/1987 Fed. Rep. of Germany .

Primary Examiner—Charles J. Myhre
Assistant Examiner—Weilun Lo
Attorney, Agent, or Firm—Nils H. Ljungman & Associates

[57] ABSTRACT

An internal combustion engine which includes an apparatus for wrapping a belt more than 180 degrees around a wheel of the engine.

16 Claims, 4 Drawing Sheets

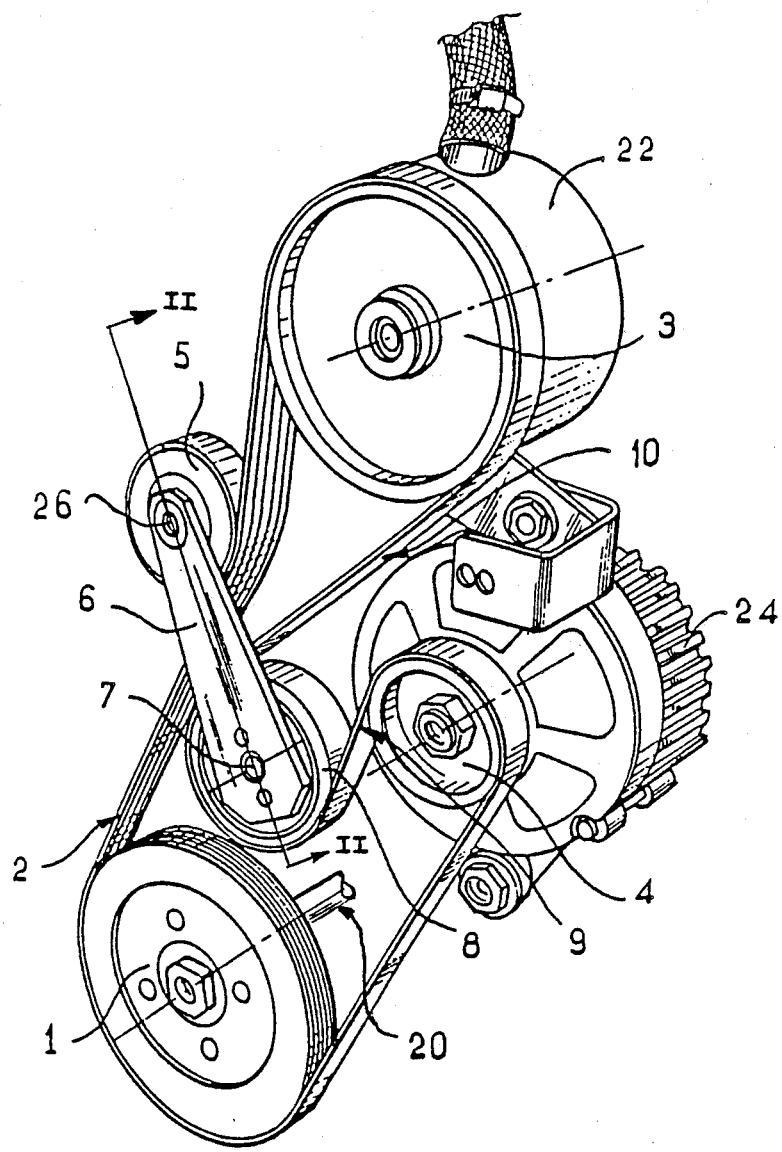
FIG_1

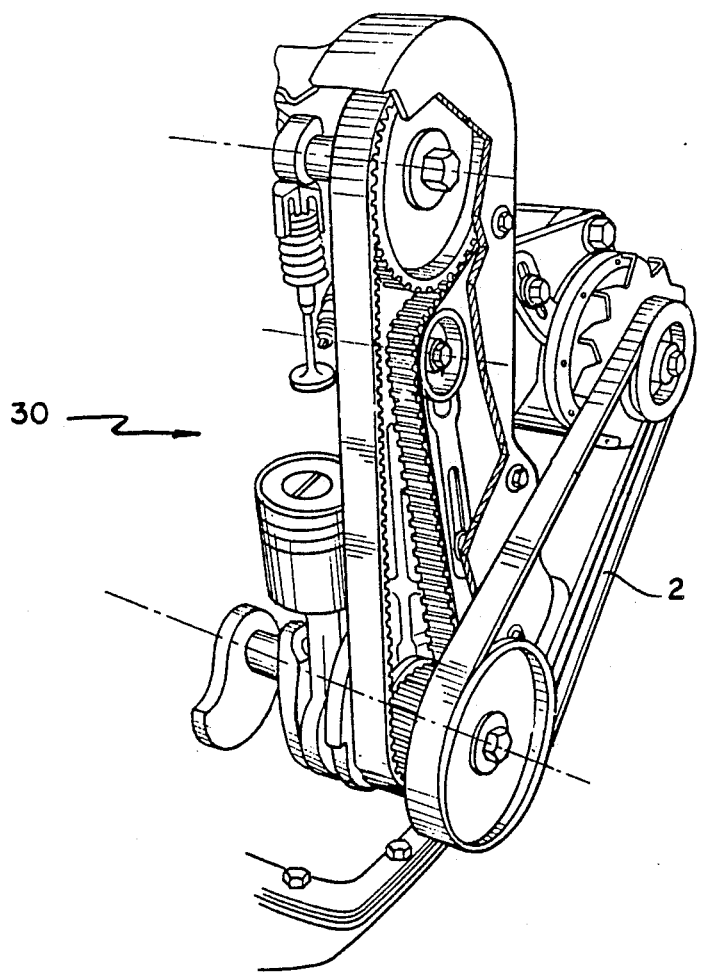
FIG_1a

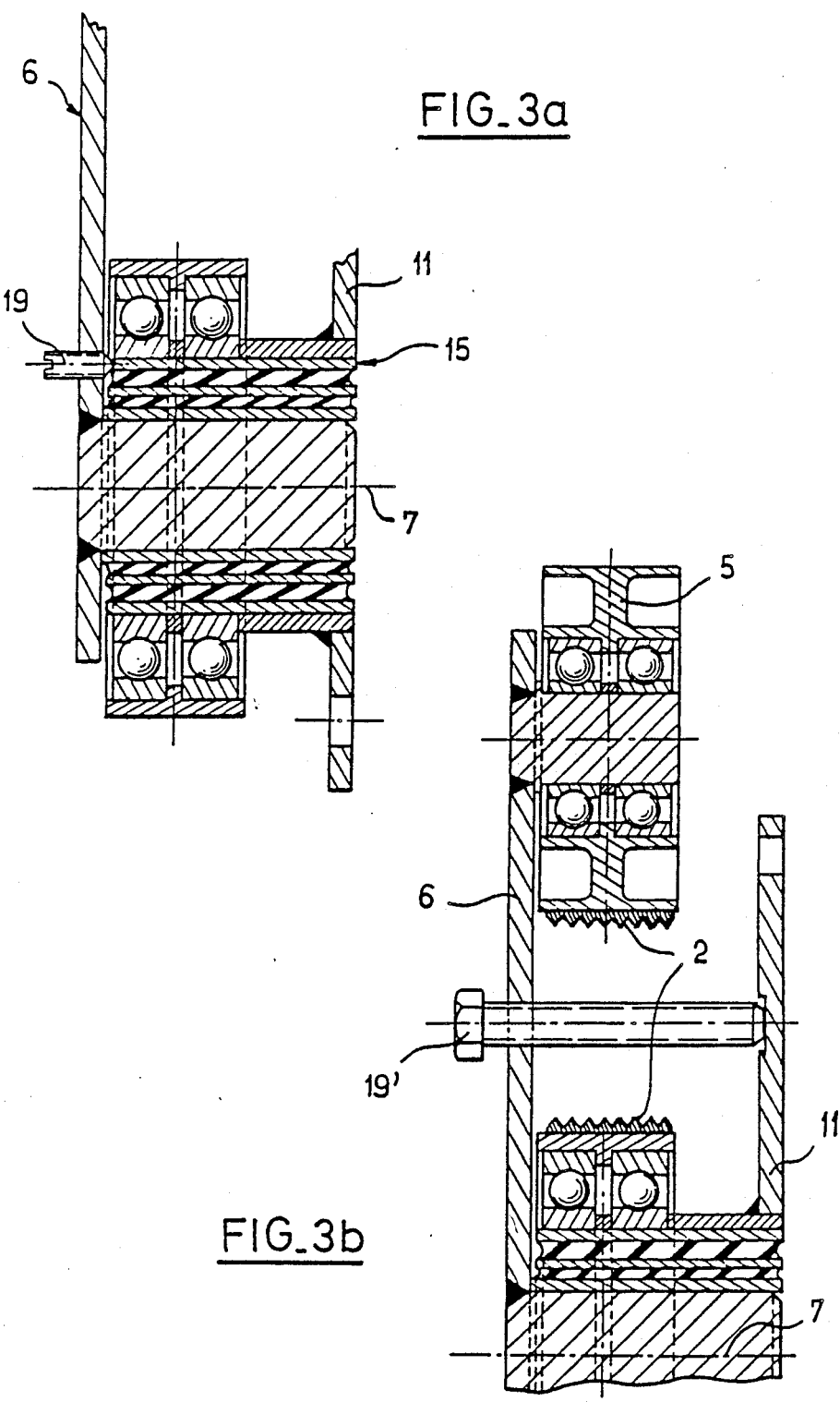

APPARATUS AND METHOD FOR WRAPPING A BELT IN AN INTERNAL COMBUSTION ENGINE AND THE LIKE AND AN INTERNAL COMBUSTION ENGINE WITH APPARATUS FOR WRAPPING A BELT AND ASSOCIATED METHOD

BACKGROUND OF THE INVENTION

1. Field of the Invention

This invention relates to internal combustion engines and, more specifically, to internal combustion engines which employ flexible link transmissions, or belts, such as trapezoidal belts, flat belts or multi-rib belts.

2. Description of the Prior Art

The tensioning devices of the prior art exert an elastic force on belts through an idle roller, which is supported at the end of an oscillating arm to which an elastic torque from a spring is applied. Frequently, the roller rolls on the smooth, back side of the belt. Under such circumstances, there is no need for mechanical adherence, or friction, between the roller and the belt. The lever arm pivots on a shaft which supports the elastic tensioning device, thereby forming an assembly hereinafter designated as the "tensioning roller."

Several examples of this type of device are disclosed by German Patent No. 35 28 442, which is assigned to Daimler-Benz; French Patent No. 2.509.408, which is assigned to Litens Automotive; and U.S. Pat. No. 4,472,162, which is assigned to Dyneer Corporation. In the devices disclosed in the latter two patents, a tensioning torque is applied to belts by means of a torsion coil spring and damping is provided by friction applied by rubber rings. In the first cited patent an elastic torque is exerted by means of a of a brake which is controlled by detectors. Such arrangements offer a great deal of flexibility, which makes it possible to provide a constant tension for the flexible link, but the damping of the tension variations subjects the device to random wear by the abrasion or creep of the elastomer compound used for the friction damping. An electromagnetic damping device, of course, can usually only be used in conjunction with expensive sensors and corresponding software.

European Patent No. 114,779, also, relates to a device of the type described above. This patent discloses a device in which an elastic ring is used as a pivot bearing and a torsion spring. The device provides regulation capabilities obtained by rotation of a fixed ring on a socket having a pawl and ratchet mechanism, thereby taking advantage of the axial flexibility of the elastic ring.

The greatest disadvantage of the devices of the prior art relates to the physical dimensions of the tensioning devices necessary to ensure a sufficient degree of tension.

SUMMARY OF THE INVENTION

The present invention utilizes a tensioning roller in which an oscillating arm, supporting an idler roller, pivots on an elastic ring which supplies the arm with recall torque.

Even with the restricted dimensions of an internal combustion engine, this arrangement permits the advantageous positioning of a second idler roller, concentric to the oscillating arm bearing and disposed around the fixed pivot point on the engine about which the elastic ring pivots. This arrangement with the second idler roller often permits the winding of an engine belt to a greater extent around one or more pulleys over which the belt travels than would be the case if the present invention were not used.

The relative arrangement of the pulleys then facilitates the utilization of this new roller to give the accessories, which are adjacent to the roller, a winding angle on these pulleys significantly greater than previously possible. This increase in the winding angles about the pulleys is accomplished usually without modifying the previously employed locations and the way which the accessories are fastened to the motor. This increased winding angle is, frequently, double the angle usually used for installations in the devices of the prior art. In the most frequent case, a belt, or any other flexible link which employs mechanical adherence ore friction, is mounted on three pulleys. One pulley is a drive pulley. The other two pulleys are driven pulleys, which may operate at different angular speeds and, therefore, usually result in different tangential forces especially under varying load conditions.

Mechanical systems, which do not use the system of regulating tension by spacing apart one of the various accessories, as disclosed in the prior art, require instead, an elastic tension which can be provided by a movable arm supporting a tensioning roller. This latter device allows a more rigid mounting of the accessories, an advantage which is used in the embodiments of the present invention.

The tensioning roller is preferably a pre-mounted assembly which is preferably adapted to be fastened to the crankcase of the engine within the area which is defined by the perimeter of the belt, and preferably in the area in the middle of the three pulleys of the engine. The idle roller, at the end of the tensioning arm, is usually pressed against the exterior of the belt, thereby increasing the winding angle of the belt on the two pulleys preferably by several degrees, in comparison to a belt which remains straight and not modified by the third pulley.

In the present invention, the geometry of the various parts of the engine allow an additional idler roller to be positioned about the pivot point of the tensioning arm on an elastic torsion ring. With a belt length increased by two decimeters, for example and, therefore, a belt typically heavier by 25 to 30 grams as compared to a belt used in conventional devices, this additional idle roller provides a winding angle which is greater than 180 degrees about the two surrounding pulleys. However, devices of the prior art frequently make it difficult to exceed a winding angle of 60 degrees for one of the pulleys and often practically impossible to exceed a winding angle of 85 degrees for the other pulley.

Through the employment of the idle roller of the present invention, the tension required for the transmission of a given power by a belt is reduced very significantly, since all the sides of the belt, not in contact with a pulley, remain short. Vibratory conditions are thereby often not adversely affected and the preferred constant possible tension is much more easily provided by this tensioning arm. In particular, the level of the elastic torque, in the devices of the prior art, would require that the elastic torsion ring be quite long. Moreover, the present invention reduces the amount of torque needed to be supplied by the tensioning roller, thereby allowing for the reduction of the length of the elastic torsion ring. That, in turn, eliminates one of the principal space disadvantages of the prior art. Also, the damping of a weaker elastic oscillatory force becomes easier.

An embodiment of the present invention, comprises a tensioning roller and its elastic bearing which supports a second roller. This embodiment can be pre-assembled away from the assembly line and pre-adjusted during an assembly thereof as recommended by the manufacturer of the belt, by employing a blocking bolt which prevents pivoting of the arm once it is properly adjusted. The bolt must usually be extracted to allow the assembly embodying the invention to function after positioning the support plate, supporting the assembly, on the engine crankcase.

An embodiment of the invention, therefore, provides an elastic tensioning device for a flexible link transmission, or belt, which is moved through mechanical adherence or friction, by a drive pulley and which drives two driven pulleys mounted on shafts which are usually parallel to the shaft of the drive pulley and the shaft about which the arm pivots. An elastic torque is provided to the tensioning device when the arm supporting the roller is rotated. When the arm so pivots, an elastic ring is deformed which deformation produces this torque which is a counter-torque acting to maintain the desired tension of the belt.

An embodiment of the invention is characterized by the fact that the same shaft, around which the arm pivots, acts as a bearing, by means of an elastic ring, for the second idler roller, which is preferably in a fixed relationship to the shafts of the driven pulleys. That configuration of the two idler rollers, in turn, allows the flexible transmission link to adopt a wrap around angle which is often greater than 180 degrees preferably on each of the driven pulleys. This allows belt tensions to be used which are often much lower than those previously required for the same power transmission requirements of a prior art configuration in an engine.

The present invention provides an internal combustion engine comprising a mechanical power generation apparatus, first wheel apparatus defining a first round surface for being connected to and receiving mechanical power from said mechanical power generation apparatus, second wheel apparatus defining a second round surface and positioned in spaced-apart relation with respect to the first wheel apparatus. The second wheel apparatus is for being connected to and for receiving at least a portion of the mechanical power from the first wheel apparatus. A belt having an internal surface and an external surface is provided for being connected between the first wheel apparatus and the second wheel apparatus for transferring the mechanical power from the first wheel apparatus to the second wheel apparatus. A belt tension adjusting device is also provided for being in contact with the external surface of the belt by applying a controlled amount of force to the belt. The belt tension adjusting device is pivotally supported by a shaft. Pivoting of the belt tension adjusting device on the shaft alters the tension of the belt. Belt wrapping apparatus comprising a wrapping idler roller rotatably positioned by the shaft is also provided. The belt wrapping apparatus is configured and relatively positioned with respect to the first wheel apparatus and the second wheel apparatus to wrap the belt more than 180 degrees around the second round surface of the second wheel apparatus. Thereby less belt tension is required to avoid slippage of the belt on the second round surface of the second wheel apparatus than if the wrapping of the belt around the second round surface of the second wheel apparatus were less than 180 degrees.

The present invention provides a method for wrapping a belt having an internal surface and an external surface around a first wheel, defining a first round surface, and a second wheel, defining a second round surface. The belt is placed in a controlled amount of tension by belt tension apparatus, which is in contact with and the external surface of the belt by applying a controlled amount of force to the belt. The belt tension apparatus is pivotally supported by a pivoting apparatus.

The pivoting of the belt tension apparatus for altering the tension of the belt comprises the steps of providing belt wrapping device which has a wrapping idler roller rotatably positioned on the shaft. The belt wrapping device is configured and relatively positioned with respect to the first wheel and the second wheel to wrap the belt a substantial wrapping angle around at least one of the first round surface on the first wheel and the second round surface on the second wheel. Wrapping the belt a substantial wrapping angle around at least one of the first round surface of the first wheel and the second round surface of the second wheel, such that the angle of wrapping of the belt around at least one of the first round surface of the first wheel and the second round surface of the second wheel is greater than the angle of wrapping of the belt around at least one of the first round surface of the first wheel and the second round surface of the second wheel without said belt wrapping means. Providing less belt tension to avoid slippage of the belt on at least one of the first round surfaces of the first wheel and the second round surface of the second wheel than if the wrapping of the belt around at least one of the first round surface of the first wheel and the second round surface of the second wheel were done than without said belt wrapping device.

Further provided is an apparatus for wrapping a belt having an internal surface and an external surface around a first wheel defining a first round surface and a second wheel defining a second round surface. The belt is placed in a controlled amount of tension by belt tension apparatus being in contact with at least one of the internal surface and the external surface of the belt and for applying a controlled amount of force to the belt. The belt tension apparatus is pivotally supported on a shaft. Pivoting of the belt tension apparatus on the shaft alters the tension of the belt. The appartus for wrapping a belt comprises a belt wrapping device comprising a wrapping idler roller rotatably positioned on the shaft. The belt wrapping device is configured and relatively positioned with respect to the first wheel and the second wheel to wrap the belt more than 180 degrees around at least one of the first round surface of the first wheel and the second round surface of the second wheel, whereby less belt tension is required to avoid slippage of the belt on at least one of the first round surface of the first wheel and the second round surface of the second wheel than if said wrapping of the belt around at least one of the first round surface of the first wheel and the second round surface of the second wheel were less than 180 degrees.

BRIEF DESCRIPTION OF THE DRAWINGS

The following description of the preferred embodiment may be better understood when taken in conjunction with the appended drawings in which:

FIG. 1a is a perspective view, partially in section of a portion of an internal combustion engine;

FIG. 1 is a perspective view of portions of an internal combustion engine which employs the present invention;

FIGS. 3a and 3b are partial views of FIG. 2 and show blocking bolts to avoid relative movement between members of the internal combustion engine of FIG. 1.

DESCRIPTION OF THE PREFERRED EMBODIMENT

Figure 2:
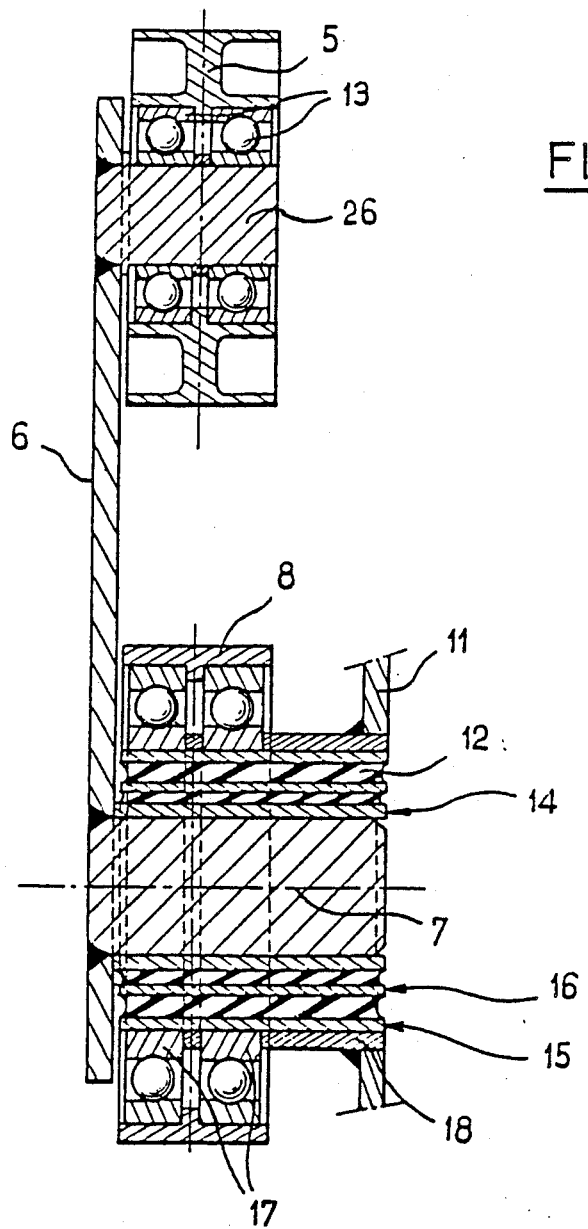
FIG. 2 is a sectional view of the present invention taken along line II—II of FIG. 1.

FIG. 1a shows an internal combustion engine 30 with a belt 2, such an engine as those employed in an automobile, which could employ the present invention. If the engine is transverse-mounted in an automobile, the plane defined by an engine belt is parallel to a longitudinal axis of the vehicle.

Now referring to FIG. 1, a drive pulley 1 is mechanically connected to a crankshaft 20 of the engine. The crankshaft 20 supplies mechanical power to the drive pulley 1. The drive pulley 1, in turn, drives the belt 2, which preferably has a multi-ribbed internal surface and a non-ribbed external surface. The belt 2, as shown, drives two engine accessories, which are shown here as a hydraulic pump 22, which may be a water pump or a power steering pump and which is operated by mechanical power supplied to a pulley 3 from the belt 2, and an alternator 24 which is operated by mechanical power, also supplied to a pulley 4 by the belt 2. The alternator 24 is, preferably, driven at a higher rotational speed than the hydraulic pump 22.

Instead of a hydraulic pump, an air conditioner could be driven by the belt 2. A tensioning roller 5, which is supported by a lever 6, exerts a tension force on a preferably non-ribbed external surface of the belt 2. As shown in FIG. 1, the tension roller 5 typically increases the winding angle of the belt 2 around the drive pulley 3 and the drive pulley 1 by only several degrees more than if the belt 2 ran in a straight line between the pulleys 1 and 3.

The tension applied to the belt 2, from the roller 5, is supplied by an elastic ring 12 which pivots on a shaft 7. The shaft 7 also supports an idle roller 8.

The belt 2 is positioned so that the rollers 5 and 8 ride on the non-ribbed external surface of the belt 2. Also, the rollers 5 and 8 are relatively positioned with respect to one another and to straight lengths 9 and 10 of the belt 2 so that the winding, or wrap around, angle of the belt 2 around the pulleys 3 and 4 is preferably greater than 180 degrees. The pulley 4 most frequently drives the alternator 24 at rotational velocities which can exceed 9000 rpm and, therefore, the mechanical or frictional, adherence of the belt 2 to the pulley 4 is critical in this type of belt driven transmission system since the inertias of rotation are large when rapid changes in conditions, such as engine speed, occur. The current typical mounting configuration of these accessories, without the employment of the present invention, allows for a winding angle of the belt 2 which is sometimes less than 60 degrees. Such a small winding angle necessitates more belt tension, to avoid slippage between the belt 2 and the pulley of an alternator, than is necessary when the present invention is employed since a larger winding angle necessitates less belt tension for the same amount of mechanical, or frictional, adherence and thus the same amount of power transmitted.

With the present invention, the winding angle of the straight lengths 9 and 10 of the belt 2, around the roller 8 generally allows a tension reduction preferably by a factor on the order of as much as about three, even if the winding angle approaches 180 degrees, compared to the arrangement in which the belt 2 directly connects the pulley 3 to the pulley 4.

The winding angle on the drive pulley 1, with or without the use of the present invention is about 170 to 175 degrees. Because the radius of the drive pulley is generally greater than that of the driven pulleys, the winding angle on the drive pulley 1 then becomes the winding angle which is critical in the present arrangement, and determines the required minimum tension on the belt 2. With the present invention, the amount of tension on the belt 2 can usually be reduced by a factor of about at least two, in comparison to the prior art where the present invention is not employed, thereby improving the service life of the transmission arrangement and preferably reducing the amplitude of the variations of tension, often even under extreme conditions.

Experimentally, it has been observed that the damping of vibratory oscillations was achieved through the employment of the prestressed, or preloaded, elastomer torsion ring 12.

As shown in FIG. 2, a shaft 7 may be permanently fastened, for example by welding, to the lever 6. The lever 6 may be made of steel sheet. The shaft 7 is pivotally connected to a fastening plate 11 through the ring 12. When the lever 6 and, therefore, the attached shaft 7 pivots, the ring 12 deforms and exerts a recall or restoring torque on the lever 6 since the ring 12 is attached to hold both the plate 11 and the shaft 7. A shaft 26, of the tensioning roller 5 is, preferably, welded to the lever 6 and preferably supports the inside ring or rings of a roller or other bearing 13.

In the embodiment shown in FIG. 2, the tensioning roller 5 is also preferably fitted onto two ball or even alternatively other bearings 13 so that the assembly preferably has a higher rigidity in the presence of parasitic vibrations, although the same result could also be achieved through the use of a single roller bearing, ball bearing, needle bearing or rollers.

The ring 12 preferably comprises two elastomer compound concentric rings, preferably adherized during vulcanization to interior armatures 14, 15 and 16. A much higher fatigue strength is often obtainable by exerting a radial prestress, or preload, on the elastomer compound comprising ring 12. Such a prestress may be obtained by hammering the exterior ring 15, by expansion of the interior ring 14, or by combining both techniques. As shown in FIG. 2, intermediate ring 16 usually retains its initial diameter and is not typically expanded. However, the reinforcement of the elastomer compound in this manner usually provides a much higher radial rigidity. With the above described prestress, the elastic torsion rigidity can be reduced and usually also allows longer travel of the lever 6 while the damping can often be increased while also yielding a significant hysteresis effect.

The interior armature ring 14 transmits the elastic torque to the lever 6 through the shaft 7, which is preferably permanently fastened to the lever 6 and can be milled or knurled for the purpose of permanent fastening. A hook on the end supported on a lug on lever 6 can also perform this function of permanent fastening.

Likewise, the exterior armature ring 15 may be, preferably, permanently fastened by welding or stamping to a fastening plate 11. The fastening plate 11 is, preferably, bolted into place, when the engine is assembled, to fix its position thereon. Exterior armature ring 15 has an outer diameter which is preferably the same diameter as the inner diameter of tube 18 which, in turn, is in contact with a roller bearing 17 which supports roller 8.

The two ball bearings 17 usually provide a better rigidity to vibrations than a single ball bearing arrangement. However, a single, double cage roller bearing or a bearing with tapered surfaces could perform the same function. Since, the tension acting on the belt 2 usually produces forces which generate reactionary forces on the rollers which typically are significantly lower than those which are present in devices of the prior art. The rings forming the exterior surface of the tensioning roller 5 and of the idle, roller 8 can be made of steel or aluminum, as shown, although a plastic or other material could also be used. Alternatively, the exterior ring of a standard roller bearing could also perform this function, since the functioning of the idler rollers 5 and 8 consists only of rolling on the smooth external surface of belt 2.

FIGS. 3a and 3b supplement FIG. 2, and show the position of blocking bolts 19 and 19'. These bolts 19 or 19' allow the manufacturer to adjust the structure of some of the embodiments of the invention to provide the tension of the belt to a recommended value after assembly on the engine. The engine builder, during installation of the assembly, typically bolts fastening plate 11 to the crankcase of the engine and places belt 2 in contact with the different pulleys. Then the removal of bolt 19 or 19' releases the tensioning torque to apply it to the belt 2, the value of which tensioning torque then remains at the value set by the manufacturer of the assembly.

In FIG. 3a, the blocking bolt 19, which can be placed in a threaded hole in the lever 6, blocks rotation of the lever 6 in relation to the exterior armature 15 by pressing against the armature 15. To exert reduced loading forces transversally to the surface of the armature 15 on which the bolt 19, of FIG. 3a, is pressed, the blocking bolt 19' can be positioned as shown in FIG. 3b.

With this arrangement, the belt 2 is installed and locked up by the bolt on the assembly. This assures the manufacturer of the belt that the proper tension is properly applied to the belt 2, by using the correct belt together with the correct tension device. Alternatively, a procedure to re-establish the recommended tension can also be established, which is not a function of wear and length variations, by pairing one belt to the correct assembly.

In summary, this invention improves the operating conditions of flexible link transmissions operating by mechanical adherence, on one hand by reducing the tension to only the tension required for the belt and, on the other hand, by making possible an improved control of the value of the tension during installation and maintenance.

It also allows the engine builder greater flexibility in the installation of accessories but, above all, adds a greater rigidity in relation to parasite vibrations since the only movable piece is the lever of the tensioning roller, which is substantially isolated by ring 12 from transmissions of vibrations thereto at acoustical frequencies.

In summary, one feature of the invention resides broadly in an elastic tensioning device for flexible link transmission operating by mechanical adherence, connecting a drive pulley 1 to at least two driven pulleys 3 and 4 having parallel shafts and activated by an elastic torque from the rotation of an arm supporting a tensioning roller 5, pivoting by its simple deformation around an elastic ring 12, which generates said torque, characterized by the fact that this same pivot shaft 7 serves as a bearing, by means of said elastic ring 12 for a second idle roller 8, fixed in relation to the shafts of the driven pulleys, which allows said flexible transmission link 2 to have a winding angle greater than 180 degrees on each of said driven pulleys 3 and 4, thereby allowing much lower tensions for the same power transmission requirements.

Another feature of the invention resides broadly in an elastic tensioning device for flexible link transmission operating by mechanical adherence characterized by the fact that a pre-setting in the factory is realized by blocking the elastic rotation torque of the arm supporting the tensioning roller 5 by means of a bolt 19, 19' which will be unblocked after the installation of the transmission.

This invention further relates to tensioning rollers which apply a tension to the belts by means of a lever which has an elastic recall torque. The tension provides a force between the belts and pulleys over which the belts travel which is of a magnitude sufficient to avoid slippage between the belts and the pulleys.

A technician skilled in the art can make various modifications to the tensioning device which is the subject of the invention, or use different combinations of its constituent elements, and in particular use more than two idler rollers, without going beyond the context of the invention.

U.S. Pat. No. 4,326,848, entitled "Constant Belt Tension Device" and U.S. Pat. No. 4,036,029, entitled "Air Conditioning Unit For Automobiles", disclose internal combustion engine devices.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. Internal combustion engine comprising:
   mechanical power generation means;
   first wheel means defining a first round surface being connected to and receiving mechanical power from said mechanical power generation means;
   second wheel means defining a second round surface and positioned in spaced-apart relation with respect to said first wheel means, said second wheel means being connected to and receiving at least a portion of said mechanical power from said first wheel means;
   belt means having an internal surface and an external surface, said belt means being connected between said first wheel means and said second wheel means for transferring said mechanical power from said first wheel means to said second wheel means;
   belt tension adjusting means being in contact with said external surface of said belt means by applying a controlled amount of force to said belt means, said belt tension adjusting means being pivotally supported by shaft means, said pivoting of said belt tension adjusting means on said shaft means altering the tension of said belt means;

belt wrapping means comprising wrapping idler roller means rotatably positioned by said shaft means, said belt wrapping means configured and relatively positioned with respect to said first wheel means and said second wheel means to wrap said belt means more than 180 degrees around said second round surface of said second wheel means, whereby less belt tension is required to avoid slippage of said belt means on said second round surface of said second wheel means than if said wrapping of said belt means around said second round surface of said second wheel means were less than 180 degrees; and further including lock means being connected to said belt tension adjusting means for avoiding said pivoting of said belt tension adjusting means on said shaft means.

2. The internal combustion engine of claim 1, further including support means for rotatably supporting said shaft means.

3. The internal combustion engine of claim 2, further including resilient member means attached to a frame means and positioned between said shaft means and said belt wrapping means, said resilient member means for damping variations of said belt tension.

4. The internal combustion engine of claim 3, wherein:
said belt tension adjusting means is pivotable on said shaft means;
said pivoting on said shaft means applies a torque to said resilient member means; and
said resilient member means applies a counter-torque to said shaft means and said belt tension adjusting means after removal of said locking means.

5. The internal combustion engine of claim 4, wherein:
said internal surface of said belt means comprises ribbed surface means;
said first round surface of said first wheel means is in contact with said internal surface of said belt means; and
said belt tension adjusting means and said belt wrapping means are in contact with said external surface of said belt means.

6. A method for wrapping a belt having an internal surface and an external surface around a first wheel, defining a first round surface, and a second wheel, defining a second round surface; the belt being placed in a controlled amount of tension by a belt tension apparatus, the belt tension apparatus being in contact with the external surface of the belt by applying a controlled amount of force to the belt, the belt tension apparatus being pivotally supported by pivoting means, the pivoting of the belt tension apparatus altering the tension of the belt, said method of wrapping a belt comprising the steps of:
providing belt wrapping means comprising wrapping idler roller means rotatably positioned on the shaft, said belt wrapping means configured and relatively positioned with respect to the first wheel and the second wheel to wrap the belt a substantial wrapping angle around the second round surface on the second wheel;
wrapping the belt a substantial wrapping angle around the second round surface of the second wheel; such that the angle of wrapping of the belt around the second round surface of the second wheel is greater than the angle of wrapping of the belt around the second round surface of the second wheel without said belt wrapping means;
providing less belt tension to avoid slippage of the belt on the second round surface of the second wheel than if said wrapping of the belt around the second round surface of the second wheel were done than without said belt wrapping means;
providing lock means for substantially avoiding the pivoting of the belt tension apparatus on the shaft;
locking and unlocking said lock means to lock and unlock said belt tension apparatus in a locked position and an unlocked position; and
substantially avoiding the pivoting of the belt tension apparatus on the shaft when said lock means is in said locked position.

7. The method of claim 6, further including the steps of:
providing support means for rotatably supporting the shaft; and
rotatably supporting the shaft with said support means.

8. The method of claim 7, further including the steps of:
providing resilient member means;
positioning said resilient member means between the shaft and said belt wrapping means;
attaching said resilient member means to said frame means; and
damping variations of the belt tension with said resilient member means.

9. The method of claim 8, further including the steps of:
pivoting the belt tension means on the shaft to provide a torque to said resilient member means; and
applying a counter-torque to the shaft and the belt tension apparatus from said resilient member means after removal of said locking means.

10. The method of claim 9, further including the steps of:
providing the internal surface of the belt with ribs;
configuring the external surface of the belt to be generally smooth;
placing the first round surface of the first wheel in contact with the internal surface of the belt; and
positioning the belt tension means and said belt wrapping means in contact with the external surface of the belt.

11. Apparatus for wrapping a belt having an internal surface and an external surface around a first wheel defining a first round surface and a second wheel defining a second round surface, the belt being placed in a controlled amount of tension by belt tension apparatus, the belt tension apparatus being in contact with the external surface of the belt and applying a controlled amount of force to the belt, the belt tension apparatus being pivotally supported on a shaft, the pivoting of the belt tension apparatus on the shaft altering the tension of the belt, said apparatus wrapping a belt comprising:
belt wrapping means comprising wrapping idler roller means rotatably positioned on the shaft, said belt wrapping means configured and relatively positioned with respect to the first wheel and the second wheel to wrap the belt more than 180 degrees around the second round surface of the second wheel, whereby less belt tension is required to avoid slippage of the belt on the second round surface of the second wheel than if said wrapping of the belt around the second round surface of the second wheel were less than 180 degrees; and further including lock means being connected to said belt tension adjusting means for selectively avoiding said pivoting of said belt tension adjusting means on said shaft means.

12. The apparatus of claim 11, further including support means for rotatably supporting said shaft means.

13. The apparatus of claim 12, further including resilient member means attached to said frame means and positioned between said shaft means and said belt wrapping means, said resilient member means for damping variations of said belt tension.

14. The apparatus of claim 13, wherein:
said belt tension adjusting means is pivotable on said shaft means;
said pivoting of said shaft means applies a torque to said resilient member means; and
said resilient member means applies a counter-torque to said shaft means and said belt tension adjusting means after removal of said locking means.

15. The apparatus of claim 14, wherein:
said internal surface of said belt means comprises ribbed surface means;
said first round surface of said first wheel means is in contact with said internal surface of said belt means; and
said belt tension adjusting means and said belt wrapping means are in contact with said external surface of said belt means.

16. A method for wrapping a belt having an internal surface and an external surface around a first wheel, defining a first round surface, and a second wheel, defining a second round surface; the belt being placed in a controlled amount of tension by belt tension apparatus, the belt tension apparatus being in contact with at least one of the internal surface and the external surface of the belt by applying a controlled amount of force to the belt, the belt tension apparatus being pivotally supported by pivoting means, the pivoting of the belt tension apparatus for altering the tension of the belt, said method of wrapping a belt comprising the steps of:

providing belt wrapping means comprising wrapping idler roller means rotatably positioned on the shaft, said belt wrapping means configured and relatively positioned with respect to the first wheel and the second wheel to wrap the belt a substantial wrapping angle around at least one of the first round surface on the first wheel and the second round surface on the second wheel;

wrapping the belt a substantial wrapping angle around at least one of the first round surface of the first wheel and the second round surface of the second wheel; such that the angle of wrapping of the belt around at least one of the first round surface of the first wheel and the second round surface of the second wheel is greater than the angle of wrapping of the belt around at least one of the first round surface of the first wheel and the second round surface of the second wheel without said belt wrapping means;

providing less belt tension to avoid slippage of the belt on at least one of the first round surfaces of the first wheel and the second round surface of the second wheel than if said wrapping of the belt around at least one of the first round surface of the first wheel and the second round surface of the second wheel were done without said belt wrapping means; and providing lock means for substantially and selectively avoiding said pivoting of said belt tension adjusting means on said shaft means.

* * * * *